US012655808B2

(12) United States Patent
Suzuki et al.

(10) Patent No.: US 12,655,808 B2
(45) Date of Patent: Jun. 16, 2026

(54) FUEL PRESSURE CONTROLLER FOR INTERNAL COMBUSTION ENGINE

(71) Applicant: TOYOTA JIDOSHA KABUSHIKI KAISHA, Toyota (JP)

(72) Inventors: Yuki Suzuki, Kariya (JP); Mina Tachibana, Toyota (JP); Tomihisa Tsuchiya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/023,354

(22) Filed: Jan. 16, 2025

(65) Prior Publication Data

US 2025/0243823 A1 Jul. 31, 2025

(30) Foreign Application Priority Data

Jan. 31, 2024 (JP) ................................ 2024-012544

(51) Int. Cl.

*F02D 41/38* (2006.01)
*F02D 41/00* (2006.01)
*F02M 21/02* (2006.01)

(52) U.S. Cl.

CPC ..... *F02D 41/3836* (2013.01); *F02D 41/0027* (2013.01); *F02M 21/0206* (2013.01); *F02M 21/0239* (2013.01); *F02M 21/0242* (2013.01); *F02D 2200/0602* (2013.01)

(58) Field of Classification Search

CPC ............. F02D 41/3836; F02D 41/0027; F02D 19/021; F02D 2200/0602; F02M 21/0206; F02M 21/0239; F02M 21/0242; F02M 67/12

See application file for complete search history.

(56) References Cited

U.S. PATENT DOCUMENTS 5,117,798 A * 6/1992 Nozaki .............. F02M 21/0239 123/527
2008/0245904 A1* 10/2008 Harcombe ......... F02M 63/0225 123/446
2017/0276086 A1* 9/2017 Kim ........................ F02D 41/08
2024/0247617 A1* 7/2024 Tachibana ............ F02D 19/024

FOREIGN PATENT DOCUMENTS

JP 2022182969 A 12/2022

* cited by examiner

*Primary Examiner* — Syed O Hasan

(57) ABSTRACT

A fuel pressure controller includes processing circuitry that executes a first process, a second process, and a third process as a fuel pressure reduction control. The first process includes closing both a first electromagnetic valve and a second electromagnetic valve. The second process includes adjusting the pressure of the fuel supplied to a fuel injection valve by repeatedly performing an opening and closing operation of the second electromagnetic valve. The third process includes, when the fuel pressure in a fuel pipe between the first electromagnetic valve and the second electromagnetic valve reaches a prescribed pressure, stopping the opening and closing operation of the second electromagnetic valve to maintain the second electromagnetic valve in an open state, and repeatedly performing the opening and closing operation of the first electromagnetic valve to adjust the pressure of the fuel supplied to the fuel injection valve.

5 Claims, 3 Drawing Sheets

FUEL PRESSURE CONTROLLER FOR INTERNAL COMBUSTION ENGINE

CROSS-REFERENCE TO RELATED APPLICATIONS

This application is based upon and claims the benefit of priority from Japanese Patent Application No. 2024-012544, filed on Jan. 31, 2024, the entire contents of which are incorporated herein by reference.

BACKGROUND

1. Field

The present disclosure relates to a fuel pressure controller for an internal combustion engine.

2. Description of Related Art

For example, an internal combustion engine disclosed in Japanese Laid-Open Patent Publication No. 2022-182969 reduces the pressure of gas fuel stored in a tank before supplying the gas fuel to fuel injection valves.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a fuel pressure controller is configured to control a fuel pressure of an internal combustion engine. The internal combustion engine includes a tank that stores fuel, a fuel injection valve that supplies fuel to a cylinder, a fuel passage that connects the tank to the fuel injection valve, a first electromagnetic valve that is provided in the fuel passage so as to selectively open and close the fuel passage, and a second electromagnetic valve that is provided in the fuel passage at a position downstream of the first electromagnetic valve in a flow direction of the fuel in the fuel passage. The second electromagnetic valve selectively opens and closes the fuel passage. The fuel pressure controller includes processing circuitry configured to perform a fuel pressure reduction control. The fuel pressure reduction control adjusts the fuel pressure such that the pressure of the fuel supplied to the fuel injection valve is lower than that before the fuel pressure reduction control is performed. The processing circuitry is configured to execute a first process, a second process, and a third process as the fuel pressure reduction control. The first process includes closing both the first electromagnetic valve and the second electromagnetic valve when an execution request for the fuel pressure reduction control is generated. The second process includes adjusting the pressure of the fuel supplied to the fuel injection valve by repeatedly performing an opening and closing operation of the second electromagnetic valve after the first process is executed. The third process includes, when the fuel pressure in the fuel passage between the first electromagnetic valve and the second electromagnetic valve reaches a prescribed pressure after the second process is executed, stopping the opening and closing operation of the second electromagnetic valve to maintain the second electromagnetic valve in an open state, and repeatedly performing the opening and closing operation of the first electromagnetic valve to adjust the pressure of the fuel supplied to the fuel injection valve.

The fuel pressure controller for the internal combustion engine can quickly reduce the pressure of the fuel supplied to the fuel injection valve and suppress the pressure fluctuation in the fuel passage.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
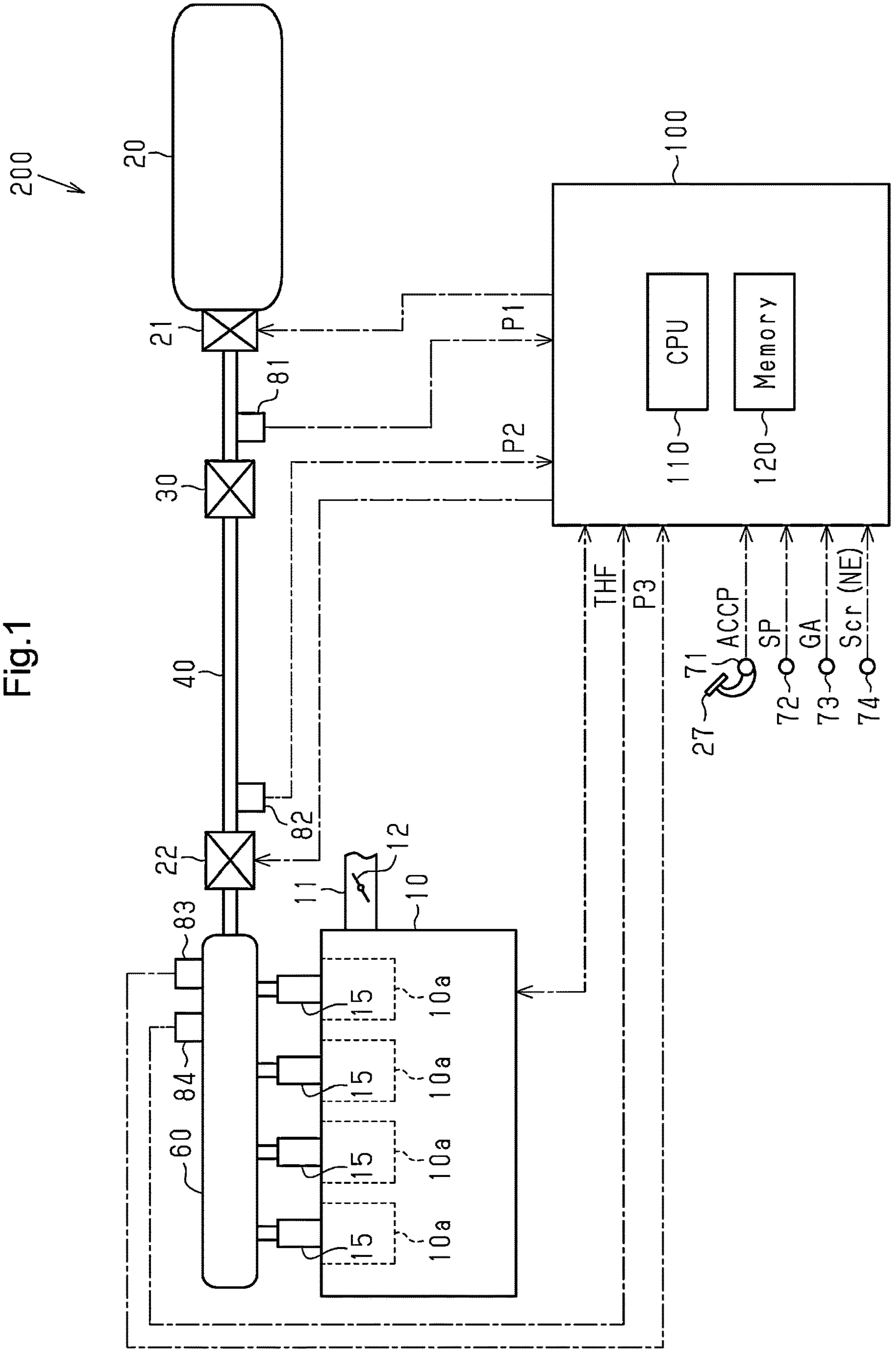
FIG. 1 is a schematic diagram of an internal combustion engine and a controller according to an embodiment.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

In the internal combustion engine as described in BACKGROUND section, the following control may be performed as the fuel pressure reduction control.

That is, an electromagnetic valve that selectively opens and closes a fuel passage is provided in the fuel passage that connects a tank that stores fuel to fuel injection valves, which supply fuel to cylinders. An allowable upper limit value and an allowable lower limit value are set for the target fuel pressure. If fuel injection from each fuel injection valve is performed in a state where the electromagnetic valve is closed, fuel flows out from the fuel passage downstream of the electromagnetic valve, so the fuel pressure downstream of the electromagnetic valve falls. When the downstream fuel pressure reaches a lower limit value, the electromagnetic valve is opened. When the electromagnetic valve is opened, fuel is supplied to the fuel passage downstream of the electromagnetic valve, so that the fuel pressure downstream of the electromagnetic valve increases. When the downstream fuel pressure reaches the upper limit value, the electromagnetic valve is closed.

By repeatedly performing such selective opening and closing of the electromagnetic valve, the pressure of the fuel downstream of the electromagnetic valve and supplied to the fuel injection valve is adjusted to a pressure within a prescribed control range defined by the upper limit value and the lower limit value.

When the fuel pressure reduction control is executed, the time until the actual fuel pressure is reduced to the fuel pressure within the control range becomes shorter as the volume of the fuel passage from the electromagnetic valve to the fuel injection valve becomes smaller. However, as the volume of the fuel passage is smaller, the pressure fluctuation caused by the opening and closing operation of the electromagnetic valve becomes more remarkable.

Therefore, when the fuel pressure reduction control is executed, it is desired to quickly reduce the pressure of the fuel supplied to the fuel injection valve and to suppress the pressure fluctuation in the fuel passage.

Hereinafter, an embodiment of a controller for an internal combustion engine will be described with reference to FIGS. 1 to 3.

Internal Combustion Engine

An internal combustion engine 10 shown in FIG. 1 is mounted on a vehicle and uses hydrogen gas, which is a gas fuel, as a fuel.

A throttle valve 12 that adjusts an intake air amount is provided in an intake passage 11 of the internal combustion engine 10.

The fuel supply device 200 provided in the internal combustion engine 10 includes multiple fuel injection valves 15, a tank 20, a fuel pipe 40, a first shut-off valve 21, a second shut-off valve 22, a pressure reducing valve 30, and a delivery pipe 60.

The fuel injection valves 15 supply fuel to cylinders **10*a* of the internal combustion engine 10**.

The tank 20 stores hydrogen gas, which is gas fuel, in a high-pressure compressed state.

The fuel pipe 40 connects the tank 20 and the delivery pipe 60.

The fuel injection valves 15 are connected to the delivery pipe 60. The fuel pipe 40 and the delivery pipe 60 are a fuel passage connecting the tank 20 and the fuel injection valves 15. The hydrogen gas stored in the tank 20 is supplied to the fuel injection valves 15 via the fuel pipe 40 and the delivery pipe 60.

The first shut-off valve 21, the pressure reducing valve 30, and the second shut-off valve 22 are arranged in the fuel pipe 40 in this order in a direction of fuel flow.

The first shut-off valve 21 is an electromagnetic valve arranged near an outlet of the tank 20. When the first shut-off valve 21 is open, fuel is supplied from the tank 20 to the fuel pipe 40. When the first shut-off valve 21 is closed, the supply of fuel from the tank 20 to the fuel pipe 40 is stopped.

The pressure reducing valve 30 is an electromagnetic valve for reducing the fuel pressure of the high-pressure hydrogen-containing gas stored in the tank 20 to a prescribed pressure (for example, about 4 MPa) and supplying the fuel pressure to the fuel injection valves 15. The pressure reducing valve 30 is a first electromagnetic valve that is provided in the fuel passage and selectively opens and closes the fuel passage.

The second shut-off valve 22 is an electromagnetic valve, and is disposed in the vicinity of the delivery pipe 60. When the second shut-off valve 22 is opened by energization, fuel is supplied to the delivery pipe 60. When the second shut-off valve 22 is closed due to the de-energization, the supply of fuel to the delivery pipe 60 is stopped. The second shut-off valve 22 is provided in the fuel passage downstream of the first electromagnetic valve in the flow direction of the fuel in the fuel passage. The second shut-off valve 22 is a second electromagnetic valve that selectively opens and closes the fuel passage.

The first shut-off valve 21 and the second shut-off valve 22 are closed while the operation of the internal combustion engine 10 is stopped. On the other hand, the first shut-off valve 21 and the second shut-off valve 22 are basically open during operation of the internal combustion engine 10.

The first pressure sensor 81 is provided in the fuel pipe 40 between the first shut-off valve 21 and the pressure reducing valve 30. The first pressure sensor 81 detects a first pressure P1 which is a fuel pressure in the fuel pipe 40 between the first shut-off valve 21 and the pressure reducing valve 30.

The second pressure sensor 82 provided in the fuel pipe 40 between the pressure reducing valve 30 and the second shut-off valve 22 detects a second pressure P2 that is the fuel pressure in the fuel pipe 40 between the pressure reducing valve 30 and the second shut-off valve 22.

A third pressure sensor 83 provided in the delivery pipe 60 detects a third pressure P3, which is a fuel pressure in the delivery pipe 60. A temperature sensor 84 provided in the delivery pipe 60 detects a fuel temperature THF which is the temperature of the fuel in the delivery pipe 60.

The controller 100 performs various controls such as fuel injection of the internal combustion engine 10 by controlling various control targets such as the throttle valve 12, the fuel injection valves 15, the first shut-off valve 21, the second shut-off valve 22, and the pressure reducing valve 30. The controller 100 includes a memory 120 constituted by storage devices such as a CPU 110, a ROM, and a RAM. The controller 100 performs various controls when the CPU 110 executes a program stored in the memory 120.

The controller 100 refers to various values used to control the internal combustion engine 10. For example, the controller 100 refers to detection values of the first pressure sensor 81, the second pressure sensor 82, the third pressure sensor 83, and the temperature sensor 84. Further, the controller 100 refers to a detection signal of an accelerator position sensor 71 that detects an accelerator operation amount ACCP that is an operation amount of an accelerator pedal 27 operated by a driver of the vehicle on which the internal combustion engine 10 is mounted. In addition, the controller 100 refers to a detection signal of a speed sensor 72 that detects a vehicle speed SP of a vehicle on which the internal combustion engine 10 is mounted. Further, the controller 100 refers to a detection signal of an air flow meter 73 that detects an intake air amount GA of the internal combustion engine 10, and a detection signal Scr of a crank angle sensor 74 that detects a rotation angle of a crankshaft of the internal combustion engine 10.

The controller 100 calculates the engine speed NE based on the detection signal Scr of the crank angle sensor 74. In addition, the controller 100 calculates an engine load factor KL based on the engine rotation speed NE and the intake air amount GA. The engine load factor KL represents the ratio of the current cylinder inflow air amount to the cylinder inflow air amount at the time of steady operation of the internal combustion engine 10 in a full load state at the current engine speed NE. The cylinder inflow air amount is the amount of air that flows into each cylinder in the intake stroke.

Hydrogen gas, which serves as the engine fuel, has a wider range of combustible air-fuel mixtures compared to gasoline and can burn even with a relatively lean air-fuel mixture. Therefore, the controller 100 adjusts the output of the internal combustion engine 10 through the following combustion control.

That is, the controller 100 calculates a required output Pe, which is a required value of the engine output of the internal combustion engine 10, based on the accelerator operation amount ACCP and the like. The controller 100 sets the required injection amount Qd based on the required output Pe. The required injection amount Qd is a target value of the fuel injected from one fuel injection valve 15 in one combustion cycle. Based on the target air-fuel ratio AFt and the required injection amount Qd, the controller 100 calculates a required air amount GAd that is a target value of the intake air amount required for obtaining the target air-fuel ratio AFt. The target air-fuel ratio AFt of the present embodiment is a lean air-fuel ratio such as an excess air ratio $\lambda$=2.5 to 3.0, for example. Then, the controller 100 controls the fuel injection valves 15 such that an amount of fuel corresponding to the required injection amount Qd is injected. Further, the controller 100 controls the opening degree of the throttle valve 12 so that an amount of air corresponding to the required air amount GAd is introduced into the cylinder. In this way, in the internal combustion engine 10, the output adjustment is performed by changing the air-fuel ratio of the air-fuel mixture through the adjustment of the fuel injection amount and the intake air amount.

Fuel Pressure Control

The controller 100 is a fuel pressure controller that adjusts the fuel pressure of the fuel supplied to the fuel injection valves 15. That is, an allowable upper limit value PNU and an allowable lower limit value PNL are set with respect to a first target pressure PNt1 (for example, about 4 Mpa) which is a target value of the fuel pressure. In a state where the first and second shut-off valves 21 and 22 are kept open, the controller 100 opens the pressure reducing valve 30 when the third pressure P3 reaches the lower limit value PNL. When the pressure reducing valve 30 opens, fuel is supplied to the fuel passage downstream of the pressure reducing valve 30, so that the fuel pressure downstream of the pressure reducing valve 30 increases. When the third pressure P3 reaches the upper limit value PNU, the controller 100 closes the pressure reducing valve 30. By repeatedly opening and closing the pressure reducing valve 30 in this manner, the pressure of the fuel downstream of the pressure reducing valve 30 and supplied to the fuel injection valves 15 is adjusted to a pressure within a prescribed control range CRN defined by the upper limit value PNU and the lower limit value PNL.

Fuel Pressure Reduction Control

On the other hand, when the fuel injection amount of the fuel injection valves 15 is decreased as in the idling operation, the controller 100 performs the fuel pressure reduction control for maintaining the third pressure P3 to be lower than the first target pressure PNt1. The fuel pressure reduction control is a control for adjusting the fuel pressure so that the fuel pressure of the fuel supplied to the fuel injection valves 15 is lower than before the fuel pressure reduction control is performed. By performing the fuel pressure reduction control, a small amount of fuel is accurately injected from the fuel injection valves 15. When the fuel pressure reduction control is executed, a second target pressure PNt2 (for example, about 1 Mpa) lower than the first target pressure PNt1 is set, and an upper limit value PLU and a lower limit value PLL allowable for the second target pressure PNt2 are set. The upper limit value PLU is a pressure lower than the above-described lower limit value PNL. Then, the controller 100 adjusts the pressure of the fuel supplied to the fuel injection valves 15 to a pressure within a prescribed control range CRL sandwiched between the upper limit value PLU and the lower limit value PLL by executing a process described later.

Figure 2:
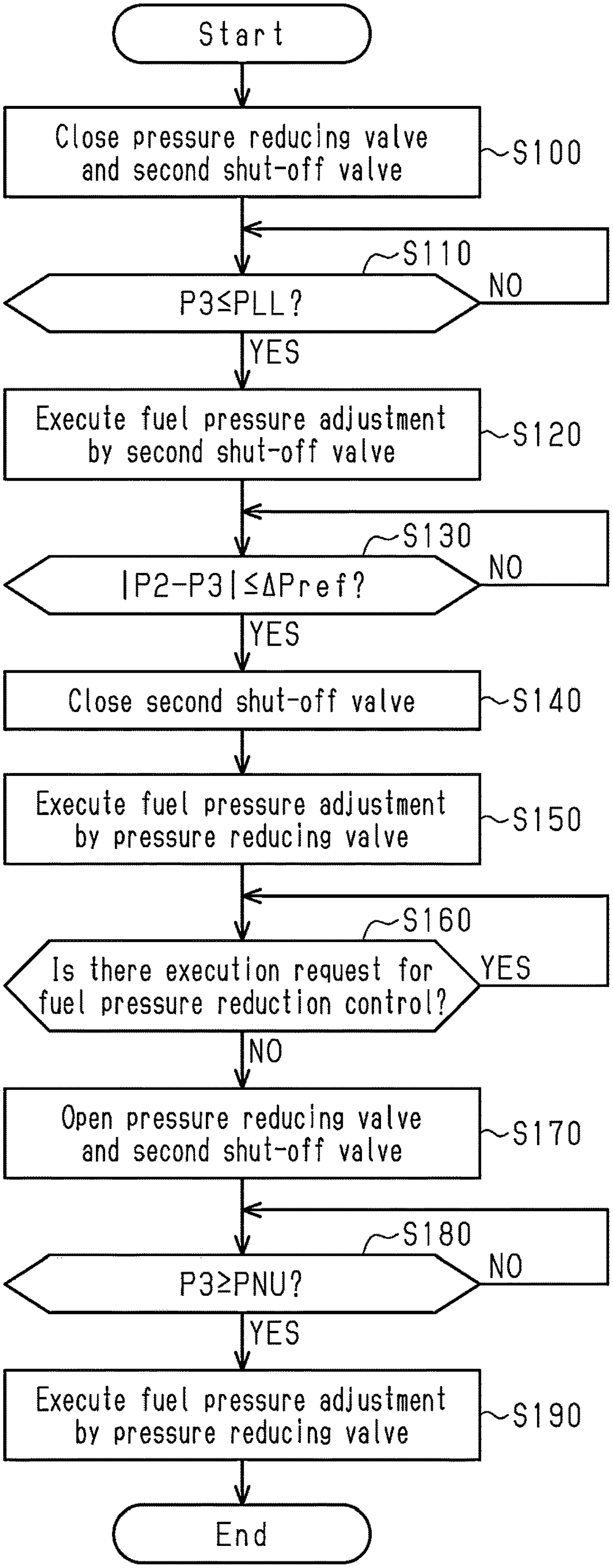
FIG. 2 is a flowchart showing a procedure of processes executed by a controller according to the embodiment.

The controller 100 executes a process shown in FIG. 2 in order to perform the fuel pressure reduction control.

FIG. 2 illustrates a procedure for processes executed by the controller 100. The processing shown in FIG. 2 is implemented by the CPU 110 executing a program stored in the memory 120 of the controller 100. The process shown in FIG. 2 is started when there is an execution request for the fuel pressure reduction control. For example, the controller 100 requests the execution of the fuel pressure reduction control when the operation state of the internal combustion engine 10 shifts to the idling operation state. In the following description, the number of each step is represented by the letter S followed by a numeral.

When the present process is started, the controller 100 closes both the pressure reducing valve 30 and the second shut-off valve 22 (S100). The process of S100 is a first process of closing both the first electromagnetic valve and the second electromagnetic valve when the execution request for the fuel pressure reduction control is generated.

Next, the controller 100 determines whether the third pressure P3 is lower than or equal to the lower limit value PLL (S110). Then, the controller 100 repeatedly executes the process of S110 until it is determined that the third pressure P3 is lower than or equal to the lower limit value PLL.

When it is determined in the process of S110 that the third pressure P3 is lower than or equal to the lower limit value PLL, the controller 100 executes fuel pressure adjustment by the second shut-off valve 22 (S120). The fuel pressure adjustment in S120 is performed by repeatedly opening and closing the second shut-off valve 22 so that the third pressure P3 fall within the control range CRL. The process of S120 is a second process of adjusting the fuel pressure of the fuel supplied to the fuel injector by repeatedly driving the second electromagnetic valve to open and close after the first process is executed. The opening and closing operation of the second electromagnetic valve by the second process is started when the fuel pressure of the fuel supplied to the fuel injection valves reaches a prescribed pressure after the first process is executed. That is, when the third pressure P3 becomes lower than or equal to the lower limit value PLL, the opening and closing operation of the second electromagnetic valve by the second process is started.

Next, the controller 100 determines whether the absolute value of the difference between the second pressure P2 and the third pressure P3 is less than or equal to a prescribed determination value ΔPref (S130). The determination value ΔPref is an adaptive value for determining that the second pressure P2 is close to the third pressure P3.

Then, the controller 100 repeatedly executes the process of S130 until it is determined that the absolute value of the difference between the second pressure P2 and the third pressure P3 is less than or equal to the determination value ΔPref.

When it is determined in the process of S130 that the absolute value of the difference between the second pressure P2 and the third pressure P3 is less than or equal to the determination value ΔPref, the controller 100 closes the second shut-off valve 22 (140). Then, the controller 100 executes the fuel pressure adjustment by the pressure reducing valve 30 (S150). The fuel pressure adjustment in S150 is performed by repeatedly driving the pressure reducing valve 30 to open and close so that the third pressure P3 falls within the control range CRL. The processes of S140 and S150 are the third process. The third process is executed when the fuel pressure in the fuel passage between the first electromagnetic valve and the second electromagnetic valve reaches a prescribed pressure after the second process is executed. That is, the fuel pressure of the fuel supplied to the fuel injection valve is adjusted by stopping the opening and closing operation of the second electromagnetic valve to maintain the second electromagnetic valve in the open state and repeatedly performing the opening and closing operation of the first electromagnetic valve.

Next, the controller 100 determines whether there is an execution request for the fuel pressure reduction control at present (S160). Then, the controller 100 repeatedly executes the process of S160 until it is determined that there is no execution request.

When it is determined in the process of S160 that there is no execution request for the fuel pressure reduction control, the controller 100 opens both the pressure reducing valve 30 and the second shut-off valve 22 (S170). The controller 100 determines that there is no execution request for the fuel pressure reduction control, for example, when the operation state of the internal combustion engine 10 shifts to a state where the engine load is higher than that in the idling operation state. The process of S170 is a fourth process of opening both the first electromagnetic valve and the second electromagnetic valve when there is no execution request for the fuel pressure reduction control during the execution of the third process.

Next, the controller 100 determines whether the third pressure P3 is higher than or equal to the above-described upper limit value PNU (S180). Then, the controller 100 repeatedly executes the process of S180 until it is determined that the third pressure P3 is higher than or equal to the upper limit value PNU.

When it is determined in the process of S180 that the third pressure P3 is higher than or equal to the upper limit value PNU, the controller 100 executes the fuel pressure adjustment using the pressure reducing valve 30 (S190). The fuel pressure adjustment in S190 is performed by repeatedly driving the pressure reducing valve 30 to open and close so that the third pressure P3 falls within the above-described control range CRN.

When the process of S190 is executed, the controller 100 ends the present process.

Operation of the Present Embodiment

Figure 3:
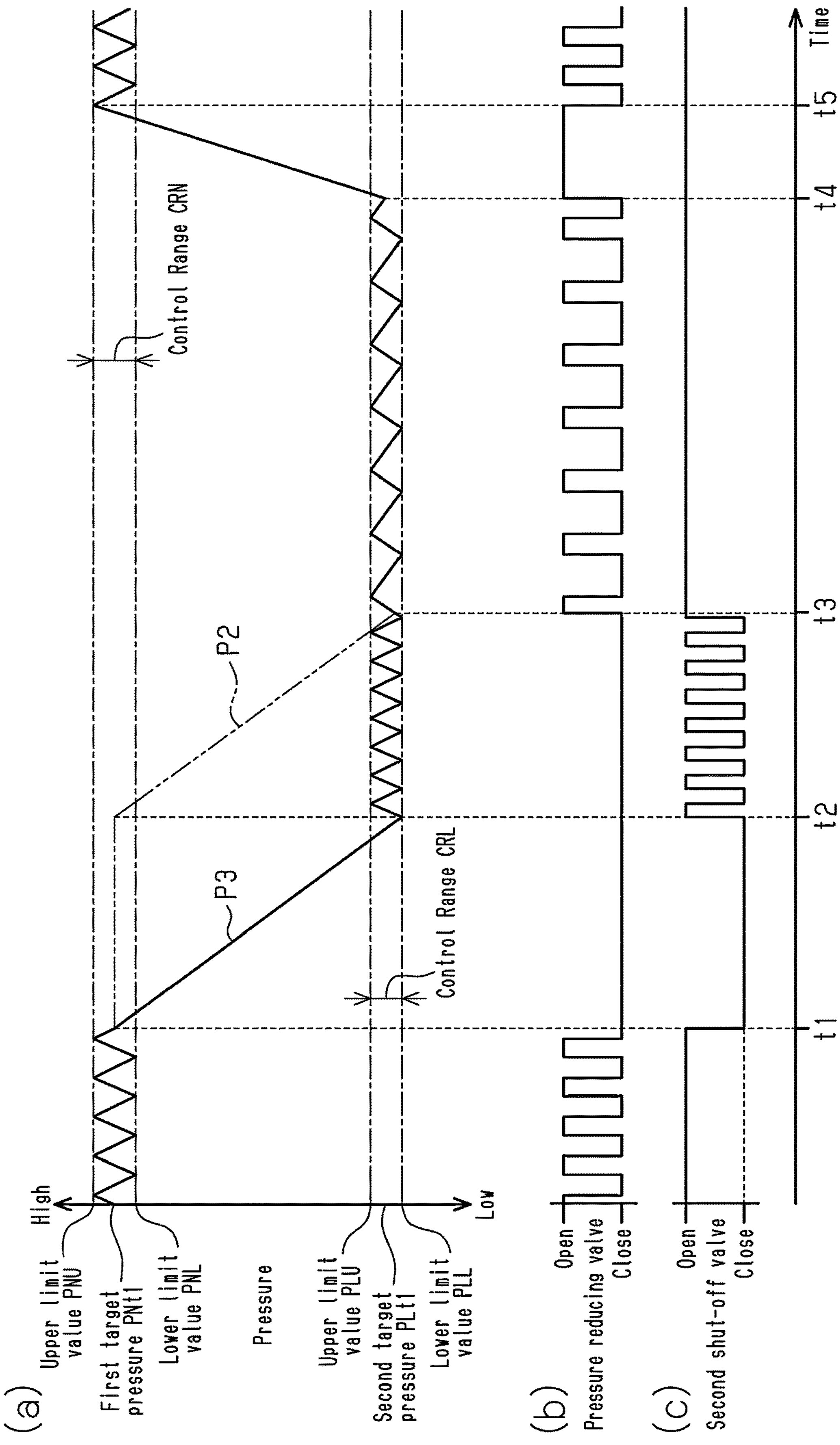
FIG. 3 is a timing diagram showing a fuel pressure reduction control according to the embodiment, in which part (a) shows changes in fuel pressure, part (b) shows an operating state of a pressure reducing valve, and part (c) shows an operating state of a second shut-off valve.

FIG. 3 shows an example of the fuel pressure reduction control. Part (a) of FIG. 3 shows the changes in the second and third pressures P2 and P3. Part (b) of FIG. 3 shows the operating state of the pressure reducing valve 30. Part (c) of FIG. 3 shows the operating state of the second shut-off valve 22.

Before a point in time t1, the hybrid vehicle is traveling normally, and the second shut-off valve 22 are maintained in the open state. By repeatedly opening and closing the pressure reducing valve 30, the second and third pressures P2 and P3 are adjusted to fuel pressures within the control range CRN.

When the idling operation of the engine 10 is requested at the point in time t1, the execution of the fuel pressure reduction control is requested. Thus, both the pressure reducing valve 30 and the second shut-off valve 22 are first closed, and this state is maintained. While the pressure reducing valve 30 and the second shut-off valve 22 are closed, the amount of fuel in the delivery pipe 60 decreases each time fuel is injected from the fuel injection valves 15. Thus, the third pressure P3 indicated by the solid lines gradually decreases, whereas the second pressure P2 indicated by the two dot chain lines is maintained at the pressure at the point in time t1.

When the third pressure P3 is decreased to the lower limit value PLL at a point in time t2, the process of S120 is started, so that the fuel pressure adjustment is started in which the second shut-off valve 22 is repeatedly opened and closed. By this fuel pressure adjustment, the third pressure P3 is adjusted to a fuel pressure within the control range CRL.

When the fuel pressure adjustment by the second shut-off valve 22 is started at the point in time t2, the fuel existing in the fuel pipe 40 between the second shut-off valve 22 and the pressure reducing valve 30 flows into the delivery pipe 60, so that the second pressure P2 gradually decreases.

At a point in time t3, when the absolute value of the difference between the third pressure P3 adjusted to the fuel pressure within the control range CRL and the decreased second pressure P2 becomes less than or equal to the determination value ΔPref, the process of S140 and the process of S150 are started. Therefore, the second shut-off valve 22 is maintained in the open state, and the fuel pressure adjustment in which the opening and closing operation of the pressure reducing valve 30 is repeatedly performed is started. By this fuel pressure adjustment, the third pressure P3 is continuously maintained at the fuel pressure within the control range CRL.

At a point in time t4, when the execution request for the fuel pressure reduction control is no longer present, the process of S170 is executed, whereby both the pressure reducing valve 30 and the second shut-off valve 22 are opened, and the state is maintained. While the pressure reducing valve 30 and the second shut-off valve 22 are open, fuel is supplied from the tank 20 to the delivery pipe 60, so that the second pressure P2 and the third pressure P3 gradually increase.

At a point in time t5, when the third pressure P3 increases to the upper limit value PNU, the above-described process of S190 is started, whereby the fuel pressure adjustment in which the opening and closing operation of the pressure reducing valve 30 is repeatedly performed is started. By this fuel pressure adjustment, the third pressure P3 is adjusted to a fuel pressure within the control range CRN.

Advantages of the Present Embodiment (1) The controller 100 executes the first process, the second process, and the third process as the fuel pressure reduction control.

The first process is a process of closing both the pressure reducing valve 30 and the second shut-off valve 22 when the execution request for the fuel pressure reduction control is generated. When the first process is executed, the second shut-off valve 22 is closed. The second shut-off valve 22 is provided downstream of the pressure reducing valve 30 in the fuel pipe 40. Therefore, as compared with the case where the pressure reducing valve 30 is closed and the second shut-off valve 22 is opened, the volume in the fuel pipe 40 from the closed electromagnetic valve to the fuel injection valves 15 becomes smaller. When the volume in the fuel pipe 40 decreases, the fuel pressure reduction speed when the fuel pressure in the fuel pipe 40 is reduced by the fuel injection from the fuel injection valves 15 increases. Therefore, when the fuel pressure reduction control is executed, the fuel pressure of the fuel supplied to the fuel injection valves 15 can be quickly reduced.

The second process is a process of adjusting the fuel pressure of the fuel supplied to the fuel injection valves 15 by repeatedly performing the opening and closing operation of the second shut-off valve 22 after the first process is executed. In the second process, the fuel pressure lowered by the execution of the first process is maintained by repeatedly performing the opening and closing operation of the second shut-off valve 22.

The third process is a process of stopping the opening and closing operation of the second shut-off valve 22 to maintain the second shut-off valve 22 in the open state when the second pressure P2, which is the fuel pressure in the fuel pipe 40 between the pressure reducing valve 30 and the second shut-off valve 22, reaches a prescribed pressure after the second process is executed. The third process is a process of adjusting the fuel pressure of the fuel supplied to the fuel injection valves 15 by repeatedly performing the opening and closing operation of the pressure reducing valve 30. Therefore, as compared with the case where the fuel pressure of the fuel supplied to the fuel injection valves 15 is adjusted by repeatedly performing the opening and closing operation of the second shut-off valve 22, the volume in the fuel pipe 40 from the electromagnetic valve driven to open and close to the fuel injection valves 15 becomes larger. When the volume of the fuel pipe 40 increases, an increase in the fuel pressure caused when the fuel consumed by the fuel injection is replenished into the fuel pipe 40 and a decrease in the fuel pressure caused by the fuel consumption in the fuel pipe 40 due to the fuel injection become gentle. Therefore, the pressure fluctuation of the fuel in the fuel pipe 40 can be suppressed. More specifically, since the fluctuation cycle of the pressure fluctuation of the fuel in the fuel pipe 40 becomes relatively long, the pressure fluctuation becomes gentle.

Further, as described above, when the fuel pressure of the fuel supplied to the fuel injection valves 15 is adjusted by repeatedly performing the opening and closing operation of the pressure reducing valve 30, the change in the fuel pressure due to the fuel replenishment to the fuel pipe 40 and the fuel consumption in the fuel pipe 40 becomes gentle. Therefore, in a case where the fuel pressure is adjusted to a pressure within the prescribed control range by repeatedly performing the opening and closing operation of the electromagnetic valve, the valve-opening period and/or the valve-closing period of the electromagnetic valve becomes relatively long, and thus the number of times of the opening and closing operation of the electromagnetic valve within a certain period of time decreases. Therefore, in the third processing, it is possible to reduce the number of operations of the electromagnetic valve provided in the fuel pipe 40 of the internal combustion engine 10, as compared with the case where the fuel pressure of the fuel supplied to the fuel injection valves 15 is adjusted by repeatedly performing the opening and closing operation of the second shut-off valve 22.

(2) The controller 100 executes a fourth process. The fourth process is a process of opening both the pressure reducing valve 30 and the second shut-off valve 22 when the execution request for the fuel pressure reduction control is no longer present during the execution of the third process. According to the fourth process, when there is no execution request for the fuel pressure reduction control, both the pressure reducing valve 30 and the second shut-off valve 22 are opened. Therefore, the fuel pressure of the fuel supplied to the fuel injection valves 15 can be quickly increased.

(3) The fuel of the internal combustion engine 10 is gas fuel. Unlike liquid fuels such as gasoline, gas fuels have poor lubricity. Therefore, in the electromagnetic valve that repeats opening and closing, wear due to sliding is likely to progress. In this regard, according to the fuel pressure controller of the present embodiment, as described above, it is possible to reduce the number of operations of the electromagnetic valve provided in the fuel pipe 40. Therefore, it is possible to suppress wear of the electromagnetic valve provided in the fuel pipe 40 of the internal combustion engine 10 using the gas fuel.

Modifications

The above-described embodiment may be modified as follows. The above-described embodiment and the following modifications can be combined as long as the combined modifications remain technically consistent with each other.

In the process of S110 shown in FIG. 2, it is determined whether the third pressure P3 is lower than or equal to the lower limit value PLL. In addition, in the process of S110, whether the third pressure P3 is a pressure within the control range CRL may be determined by another method. When the third pressure P3 is within the control range CRL, the processes after S120 may be performed in the same manner.

In the process of S130 shown in FIG. 2, it is determined whether the difference between the second and third pressures P2 and P3 is less than or equal to the determination value ΔPref. In addition, in the processing of S130, whether the second pressure P2 are within the control range CRL may be determined by another method. When the second pressure P2 is within the control range CRL, the processes after S140 may be performed in the same manner.

In the process of S180 shown in FIG. 2, it is determined whether the third pressure P3 is higher than or equal to the upper limit value PNU. In addition, in the processing of S180, whether the third pressure P3 are within the control range CRN may be determined by another method. When the third pressure P3 is within the control range CRN, the process of S190 may be performed in the same manner.

Further, in the process of S180, it may be determined whether the second pressure P2 is higher than or equal to the upper limit value PNU. When the second pressure P2 is higher than or equal to the upper limit value PNU, the process of S190 may be performed in the same manner. Further, in the process of S180, whether the second pressure P2 is a pressure within the control range CRN may be determined by another method. When the second pressure P2 is within the control range CRN, the process of S190 may be performed in the same manner.

The fuel of the internal combustion engine 10 is hydrogen gas, which is a gaseous fuel, but may be another gas fuel such as compressed natural gas.

The fuel of the internal combustion engine 10 is a gas fuel, but may be a liquid fuel.

The controller 100 is not limited to a device that includes a CPU and a memory and executes software processing. For example, the controller 100 may include a dedicated hardware circuit, such as an application specific integrated circuit (ASIC), that performs hardware processing on at least a part of the software processing in the above-described embodiment. That is, the controller 100 may be modified as long as it includes processing circuitry that has any one of the following configurations (a) to (c). (a) Processing circuitry including at least one processor that executes all of the above-described processes according to programs and at least one program storage device such as a ROM that stores the programs. (b) Processing circuitry including at least one processor and at least one program storage device that execute part of the above-described processes according to the programs and at least one dedicated hardware circuit that executes the remaining processes. (c) Processing circuitry including at least dedicated hardware circuit that executes all of the above-described processes. The program storage device, which is a computer-readable medium, includes any type of media that is accessible by general-purpose computers and dedicated computers.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A fuel pressure controller configured to control a fuel pressure of an internal combustion engine, the internal combustion engine including a tank that stores fuel, a fuel injection valve that supplies fuel to a cylinder, a fuel passage that connects the tank to the fuel injection valve, a first electromagnetic valve that is provided in the fuel passage so as to selectively open and close the fuel passage, and a second electromagnetic valve that is provided in the fuel passage at a position downstream of the first electromagnetic valve in a flow direction of the fuel in the fuel passage, the second electromagnetic valve selectively opening and closing the fuel passage, the fuel pressure controller comprising processing circuitry configured to perform a fuel pressure reduction control, wherein the fuel pressure reduction control adjusts the fuel pressure such that the pressure of the fuel supplied to the fuel injection valve is lower than that before the fuel pressure reduction control is performed, the processing circuitry is configured to execute a first process, a second process, and a third process as the fuel pressure reduction control, the first process includes closing both the first electromagnetic valve and the second electromagnetic valve when an execution request for the fuel pressure reduction control is generated, the second process includes adjusting the pressure of the fuel supplied to the fuel injection valve by repeatedly performing an opening and closing operation of the second electromagnetic valve after the first process is executed, and the third process includes, when the fuel pressure in the fuel passage between the first electromagnetic valve and the second electromagnetic valve reaches a prescribed pressure after the second process is executed, stopping the opening and closing operation of the second electromagnetic valve to maintain the second electromagnetic valve in an open state, and repeatedly performing the opening and closing operation of the first electromagnetic valve to adjust the pressure of the fuel supplied to the fuel injection valve.

2. The fuel pressure controller for the internal combustion engine according to claim 1, wherein the opening and closing operation of the second electromagnetic valve by the second process is started when the pressure of the fuel supplied to the fuel injection valve is a prescribed pressure after the first process is executed.

3. The fuel pressure controller for the internal combustion engine according to claim 1, wherein the processing circuitry is configured to execute a fourth process, and the fourth process includes opening both the first electromagnetic valve and the second electromagnetic valve when the execution request for the fuel pressure reduction control is no longer present during the execution of the third process.

4. The fuel pressure controller for the internal combustion engine according to claim 1, wherein the fuel is a gas fuel.

5. The fuel pressure controller for the internal combustion engine according to claim 1, wherein the execution request for the fuel pressure reduction control is a request generated when an operating state of the internal combustion engine shifts to an idling operation state.

* * * * *